US008630191B2

(12) United States Patent
Forbes et al.

(10) Patent No.: US 8,630,191 B2
(45) Date of Patent: Jan. 14, 2014

(54) DEVICE SELECTION FOR BROADCAST MESSAGES

(75) Inventors: Scott C. Forbes, Redmond, WA (US);
Linda Criddle, Kirkland, WA (US);
David Milstein, Redmond, WA (US);
Lon-Chan Chu, Redmond, WA (US);
Kuansan Wang, Bellevue, WA (US);
Michael D. Malueg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1435 days.

(21) Appl. No.: 11/555,587

(22) Filed: Nov. 1, 2006

(65) Prior Publication Data

US 2008/0101339 A1 May 1, 2008

(51) Int. Cl.
| H04J 1/16 | (2006.01) |
| H04L 12/16 | (2006.01) |
| H04L 12/28 | (2006.01) |
| H04H 20/71 | (2008.01) |

(52) U.S. Cl.
USPC ............ 370/252; 370/270; 370/312; 370/390

(58) Field of Classification Search
None
See application file for complete search history.

(56) References Cited

U.S. PATENT DOCUMENTS

| 5,884,032 | A | 3/1999 | Bateman et al. ............... 709/204 |
| 6,411,687 | B1 | 6/2002 | Bohacek et al. ........... 379/88.21 |
| 6,442,547 | B1 | 8/2002 | Bowman-Amuah ............ 707/10 |
| 6,625,258 | B1 * | 9/2003 | Ram et al. .................. 379/88.13 |
| 6,671,355 | B1 | 12/2003 | Spielman et al. |
| 6,704,303 | B1 | 3/2004 | Bowman-Amuah |
| 7,149,301 | B2 * | 12/2006 | Yoshida et al. .......... 379/218.01 |
| 7,231,404 | B2 | 6/2007 | Paila et al. .................. 707/104.1 |
| 7,376,129 | B2 | 5/2008 | Acharya et al. ................ 370/352 |
| 7,426,538 | B2 | 9/2008 | Bodin et al. .................. 709/204 |
| 7,443,834 | B1 * | 10/2008 | Sylvain ......................... 370/352 |
| 7,509,124 | B2 * | 3/2009 | O'Neil ........................ 455/432.2 |
| 7,724,743 | B2 * | 5/2010 | Razdan et al. .................. 370/392 |
| 7,747,568 | B2 | 6/2010 | Howell et al. ................. 707/610 |
| 7,774,790 | B1 | 8/2010 | Jirman et al. ................. 719/318 |
| 7,983,247 | B2 | 7/2011 | Howell et al. ................. 370/352 |

(Continued)

FOREIGN PATENT DOCUMENTS

| EP | 1 107 549 A3 | 6/2001 |
| EP | 1 548 997 A1 | 6/2005 |

OTHER PUBLICATIONS

Office Action dated Apr. 1, 2010, issued in U.S. Appl. No. 11/444,746.

(Continued)

Primary Examiner — Faruk Hamza
Assistant Examiner — Cassandra Decker
(74) Attorney, Agent, or Firm — Merchant & Gould

(57) ABSTRACT

The present invention is directed to a method and system for broadcasting a message to selected devices. More specifically, the method and system identifies appropriate VoIP devices of a recipient client suitable for a broadcast message and transmits the broadcast message to the identified appropriate VoIP devices over a digital communication channel. The appropriate VoIP devices are selected in accordance with various constraints of broadcasting such as recipient client's preference, functionality and capability of the recipient VoIP device, broadcaster's bandwidth, a set of broadcasting rules, or the like. In order to identify appropriate VoIP devices or a recipient client, the information relating to the recipient client and VoIP devices may be exchanged using the digital communication channel.

20 Claims, 16 Drawing Sheets

(56) References Cited

U.S. PATENT DOCUMENTS

| | | |
|---|---|---|
| 8,135,125 B2 | 3/2012 | Sidhu et al. |
| 8,451,829 B2 | 5/2013 | Sidhu et al. |
| 2002/0035474 A1 | 3/2002 | Alpdemir .................... 704/270 |
| 2002/0085696 A1 | 7/2002 | Martin et al. ............ 379/201.03 |
| 2003/0172175 A1 | 9/2003 | McCormack et al. |
| 2003/0215078 A1 | 11/2003 | Brahm et al. |
| 2004/0141508 A1 | 7/2004 | Schoeneberger et al. ..... 370/401 |
| 2004/0146041 A1* | 7/2004 | Lee et al. ........................ 370/349 |
| 2004/0258216 A1* | 12/2004 | Reid .......................... 379/88.13 |
| 2005/0039216 A1 | 2/2005 | Oota |
| 2005/0044197 A1 | 2/2005 | Lai ............................... 709/223 |
| 2005/0281284 A1 | 12/2005 | Shim et al. |
| 2005/0286711 A1 | 12/2005 | Lee et al. |
| 2006/0015580 A1* | 1/2006 | Gabriel et al. ................ 709/219 |
| 2006/0077956 A1* | 4/2006 | Saksena et al. ............... 370/352 |
| 2006/0153357 A1 | 7/2006 | Acharya et al. .......... 379/266.01 |
| 2007/0230443 A1 | 10/2007 | Milstein et al. .............. 370/352 |
| 2007/0239685 A1 | 10/2007 | Howell et al. ..................... 707/3 |
| 2007/0265830 A1 | 11/2007 | Sidhu et al. ....................... 704/9 |
| 2007/0265990 A1 | 11/2007 | Sidhu et al. ................... 705/418 |
| 2007/0280204 A1 | 12/2007 | Howell et al. ................ 370/352 |
| 2008/0052400 A1 | 2/2008 | Ekberg ......................... 709/227 |
| 2009/0083426 A1* | 3/2009 | Cagenius ...................... 709/227 |
| 2012/0044932 A1 | 2/2012 | Sidhu et al. |

OTHER PUBLICATIONS

Office Action dated Feb. 2, 2010, issued in U.S. Appl. No. 11/432,163.
Office Action dated Jan. 11, 2010, issued in U.S. Appl. No. 11/400,612.
Office Action dated Jun. 10, 2009, issued in U.S. Appl. No. 11/400,612.
Office Action dated Jun. 9, 2009, issued in U.S. Appl. No. 11/444,746.
Office Action dated May 12, 2008, issued in U.S. Appl. No. 11/400,612.
Office Action dated Nov. 25, 2008, issued in U.S. Appl. No. 11/400,612.
Office Action dated Nov. 28, 2008, issued in U.S. Appl. No. 11/444,746.
Office Action dated Sep. 29, 2009, issued in U.S. Appl. No. 11/444,746.
Office Action dated Apr. 15, 2010, issued in U.S. Appl. No. 11/431,957.
Office Action dated Jul. 19, 2010, issued in U.S. Appl. No. 11/432,163.
Office Action dated Aug. 25, 2010, issued in U.S. Appl. No. 11/444,746.
Office Action dated Sep. 27, 2010, issued in U.S. Appl. No. 11/431,957.
AudioTX Communicator, "Communicator Is an IP Codec-Audio Over IP," *ISDN Codec and Audio over IP Network Software solution*, <http://www.audiotx.com/main.html> [retrieved Jun. 2, 2006].
Cisco Systems, "IP Phones for all Business Environments," *Cisco 7900 Series IP Phones—Products and Services—Cisco Systems*, <http://www.cisco.com/en/US/products/hw/phones/ps379/index.html> [retrieved Feb. 2, 2006].
Office Action dated Feb. 2, 2011, issued in U.S. Appl. No. 11/444,746.
Office Action dated Mar. 16, 2011, issued in U.S. Appl. No. 11/431,957.
Office Action dated Aug. 30, 2011, issued in U.S. Appl. No. 11/431,957.
Office Action dated Dec. 19, 2012, issued in U.S. Appl. No. 13/284,572.

* cited by examiner

DEVICE SELECTION FOR BROADCAST MESSAGES

BACKGROUND

Generally described, an Internet telephony system provides an opportunity for users to have a call connection with enhanced calling features compared to a conventional Public Switched Telephone Network (PSTN) based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide.

In some instances, there is a need to efficiently broadcast messages to a large group of users via VoIP communication channels. However, it is not an easy task for a message broadcaster to decide which devices associated with each user will be contacted for the broadcast messages since a user may have different kinds of devices with various levels of functionality and capability. For example, some simple VoIP devices can process voice messages but not video messages due to lack of necessary applications or functionality to process video data. Even if some VoIP devices can process video data, the VoIP device may lack the capacity to receive a large sized file, or may not have a display unit suitable for the video data. If a broadcast message is transmitted to a VoIP device which does not have the necessary applications or functionality to process or to receive it, the broadcast message may not reach the user. Consequently, such transmission may waste the resources of the receiving user, the VoIP device, and the message broadcaster. Current VoIP approaches may not provide message broadcasters with the ability to select an appropriate device based on the format of a broadcast message.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present invention, a method for selecting a device suitable for receiving a broadcast message over a digital communication channel is provided. The method includes identifying a recipient client for the broadcast message to be sent to and the VoIP device(s) of the recipient client that is capable of receiving the broadcast message. In order to identify VoIP devices, device information relating to the recipient client may be obtained. The device information may be transmitted as part of contextual information over a digital communication or obtained from a third party. Based on existing constraints with respect to recipient devices, appropriate VoIP devices which are selected may be selected from among the identified devices. The broadcast message is transmitted to the selected appropriate VoIP devices over the digital communication.

In accordance with another aspect of the present invention, a method for forwarding a broadcast message to an appropriate VoIP device over a communication channel is provided. A broadcast message is received from an authorized party for forwarding to a group of designated recipients. Based on the format broadcast message, appropriate VoIP devices which have the functionality necessary to receive and process the broadcast message are identified. For each designated recipient, contextual information which includes device information of the designated recipient may be received. The broadcast message is transmitted to a device of the recipient that's capability matches the required VoIP device selection criteria. Alternatively, a recipient who has a device which is equivalent to one of the identified appropriate VoIP devices is identified.

In accordance with yet another aspect of the present invention, a computer-readable medium having computer-executable components for selecting a device desirable for communicating a message is provided. The computer-executable components include a message formulating component, a device selecting component and a communicating component. After a broadcast message is formulated in a desired format, the device selecting component identifies devices that include the functionality and applications suitable for providing the formulated broadcast message to a recipient. An appropriate device which is most desirable for communicating the broadcast message is selected from the identified devices.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to a method and system for broadcasting a message to selected devices. More specifically, the present invention relates to a method and system for identifying appropriate devices of a recipient client suitable for receiving a broadcast message and transmitting the broadcast message to the identified appropriate VoIP devices over a digital communication channel. In order to identify appropriate VoIP devices or a recipient client, information relating to the recipient client and VoIP devices may be exchanged as part of a VoIP conversation. A VoIP conversation is a data stream of information related to a conversation, such as contextual information and voice information, exchanged over a communication channel. The contextual information generally includes metadata (information of information) relating to the VoIP conversation, the recipient client, the devices of the recipient client, etc. For example, the profile information of a recipient client, a set of rules specifying constraints in selecting devices, etc. may be exchanged as part of the contextual information represented according to "structured hierarchies" over a digital communication channel. "Structured hierarchies," as used herein, are predefined organizational structures for arranging contextual information to be exchanged between two or more VoIP devices. For example, structured hierarchies may be XML namespaces. Although the present invention will be described with relation to illustrative structured hierarchies and an IP telephony environment, one skilled in the relevant art will appreciate that the disclosed embodiments are illustrative in nature and should not be construed as limiting.

Figure 1:
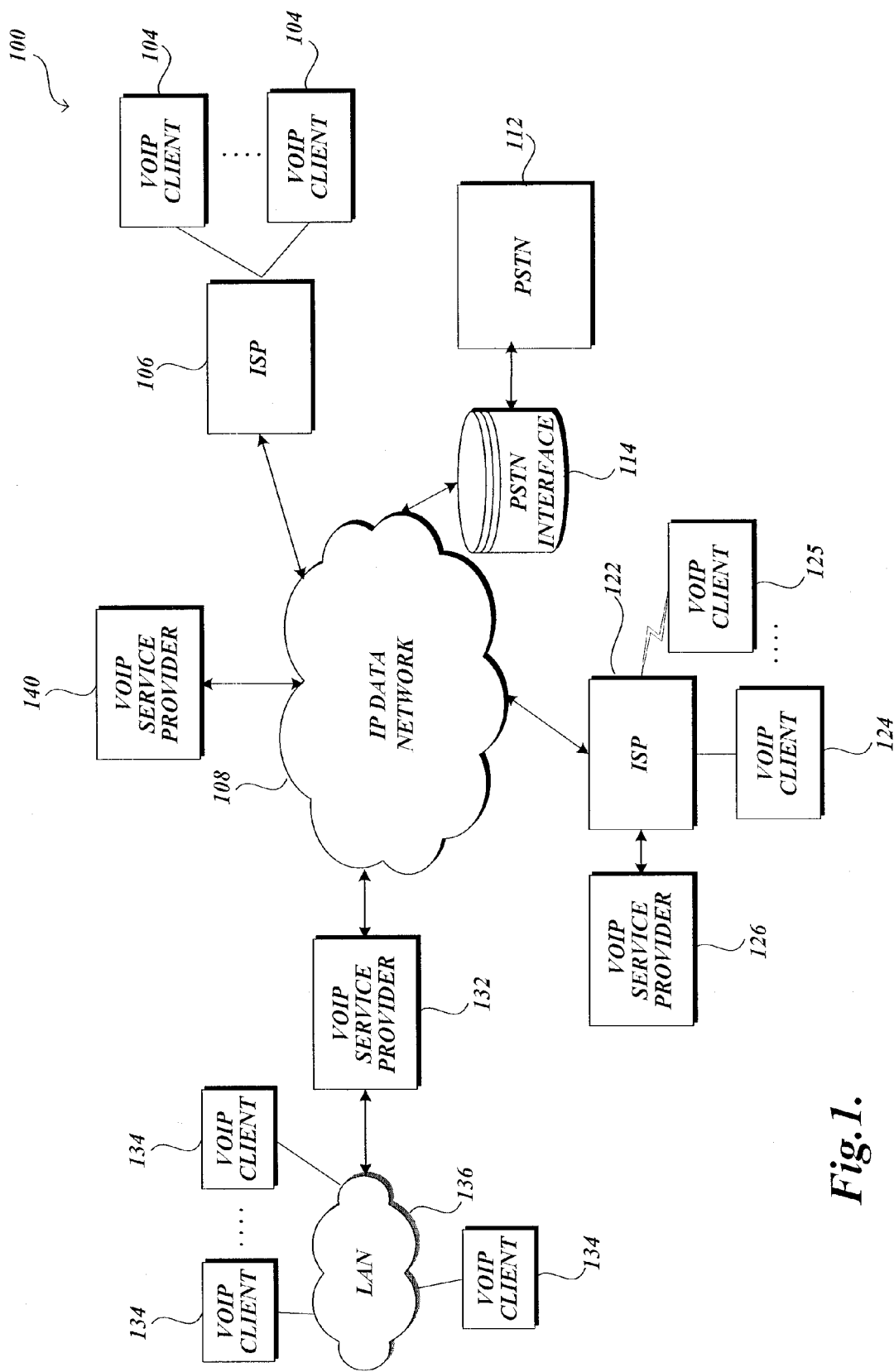
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices, and a unique VoIP client identifier. For example, a single individual, five associated VoIP devices, and a unique VoIP client identifier collectively make up a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN), and the like. The IP telephony environment 100 may further include VoIP service providers 126, 132 providing VoIP services to VoIP clients 124, 125, 134. A VoIP conversation may be exchanged as a stream of data packets corresponding to voice information, media information, and/ or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP conversation. VoIP clients 104, 124, 125, 134 may collect, maintain, and provide contextual information relating to a request signal for a communication channel. In addition, the VoIP service providers 126, 132, 140 may be any VoIP related service providers, including a broadcast call center, a customer support center, a VoIP service provider, an interactive E-commerce server, a centralized client information management server, and the like. The broadcast call center can receive a request for broadcasting a message from an authorized party. The VoIP service providers 126, 132, 140 also collect, maintain, and provide a separated set of information (e.g., provider contextual information) for providing services (requested, self-configured) for VoIP clients 104, 124, 125, 134 communicating in a VoIP conversation. The VoIP service providers 126, 132, 140 may route a request signal for a communication channel to an appropriate destination and contextual information which may assist the appropriate destination in providing the requested service, for example, forward the request for broadcasting a message.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with the PSTN 112. A PSTN interface 114 such as a PSTN gateway may provide access between PSTN 112 and the IP data network 108. The PSTN interface 114 may translate VoIP data packets into circuit switched voice traffic for PSTN 112 and vice versa.

Conventional voice devices, such as land line 116, may request a connection with the VoIP client based on the unique VoIP identifier of that client, and the appropriate VoIP device associated with the VoIP client will be used to establish a connection. In one example, an individual associated with the VoIP client may specify which devices are to be used in connecting a call based on a variety of conditions (e.g., connection based on the calling party, the time of day, etc.).

It is understood that the above-mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
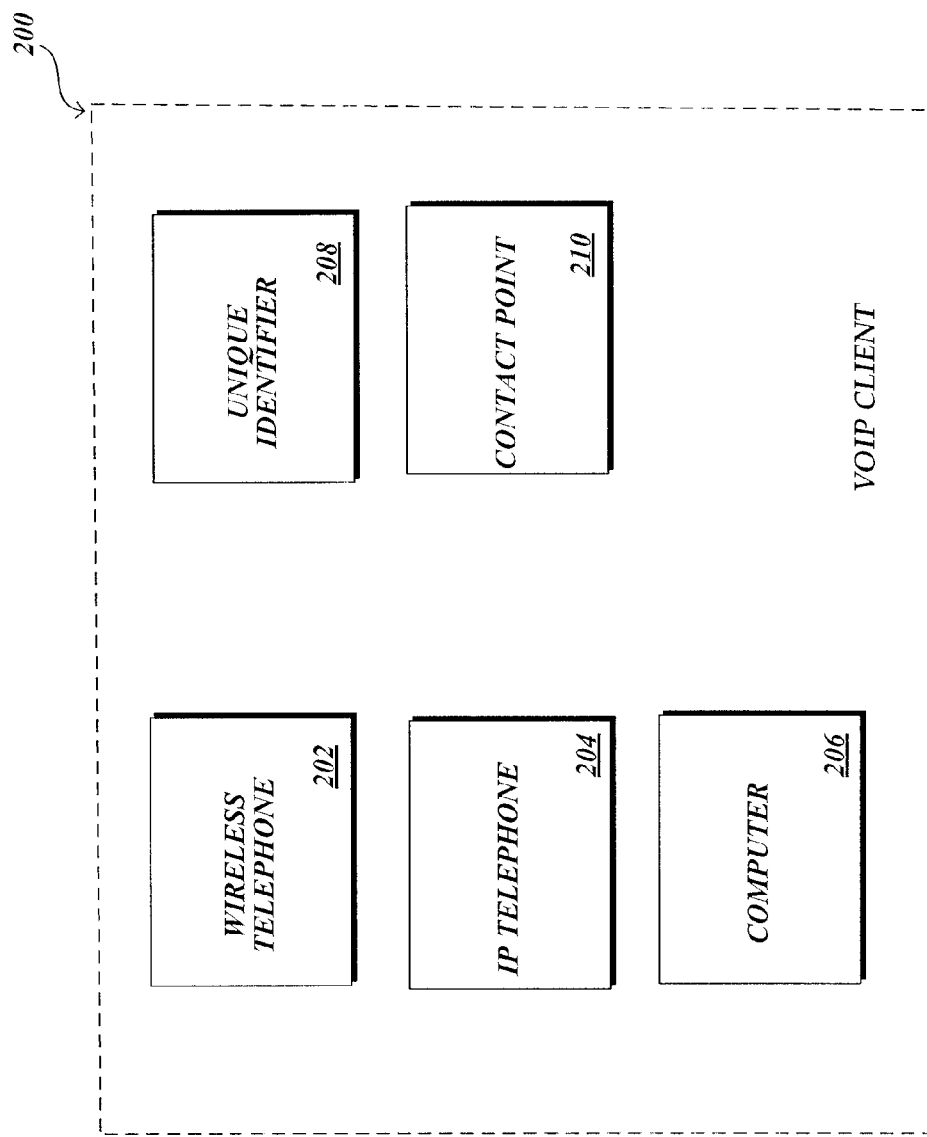
FIG. 2 is a block diagram illustrative of a VoIP client in accordance with an aspect of the present invention.

Referring now to FIG. 2, a block diagram illustrating an exemplary VoIP client 200 that includes several VoIP devices and a unique VoIP identifier, in accordance with an embodiment of the present invention, is shown. Each VoIP device 202, 204, 206 may include a storage that is used to maintain voice messages, address books, client specified rules, priority information related to incoming calls, etc. Alternatively, or in addition thereto, a separate storage, maintained, for example, by a service provider, may be associated with the VoIP client and accessible by each VoIP device that contains information relating to the VoIP client. In one embodiment, any suitable VoIP device such as a wireless phone 202, an IP phone 204, or a computer 206 with proper VoIP applications may be part of the VoIP client 200. The VoIP client 200 also maintains one or more unique client identifiers 208. The unique client identifier(s) 208 may be constant or change over time. For example, the unique client identifier(s) 208 may change with each call. The unique client identifier is used to identify the client and to connect with the contact point 210 associated with the VoIP client. The unique client identifier may be maintained on each VoIP device included in the VoIP client and/or maintained by a service provider that includes an association with each VoIP device included in the VoIP client. In the instance in which the unique client identifier is maintained by a service provider, the service provider may include information about each associated VoIP device and knowledge as to which device(s) to connect for incoming communications. In an alternative embodiment, the VoIP client 200 may maintain multiple VoIP identifiers. In this embodiment, a unique client identifier may be temporarily assigned to the VoIP client 200 for each call session.

The unique client identifier may be used similarly to a telephone number in PSTN. However, instead of dialing a typical telephone number to ring a specific PSTN device, such as a home phone, the unique client identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to the PSTN using a personal computer (VoIP device), the VoIP client identification number in conjunction with an IP address of the personal computer will eventually be converted into a telephone number recognizable in PSTN.

Figure 3:
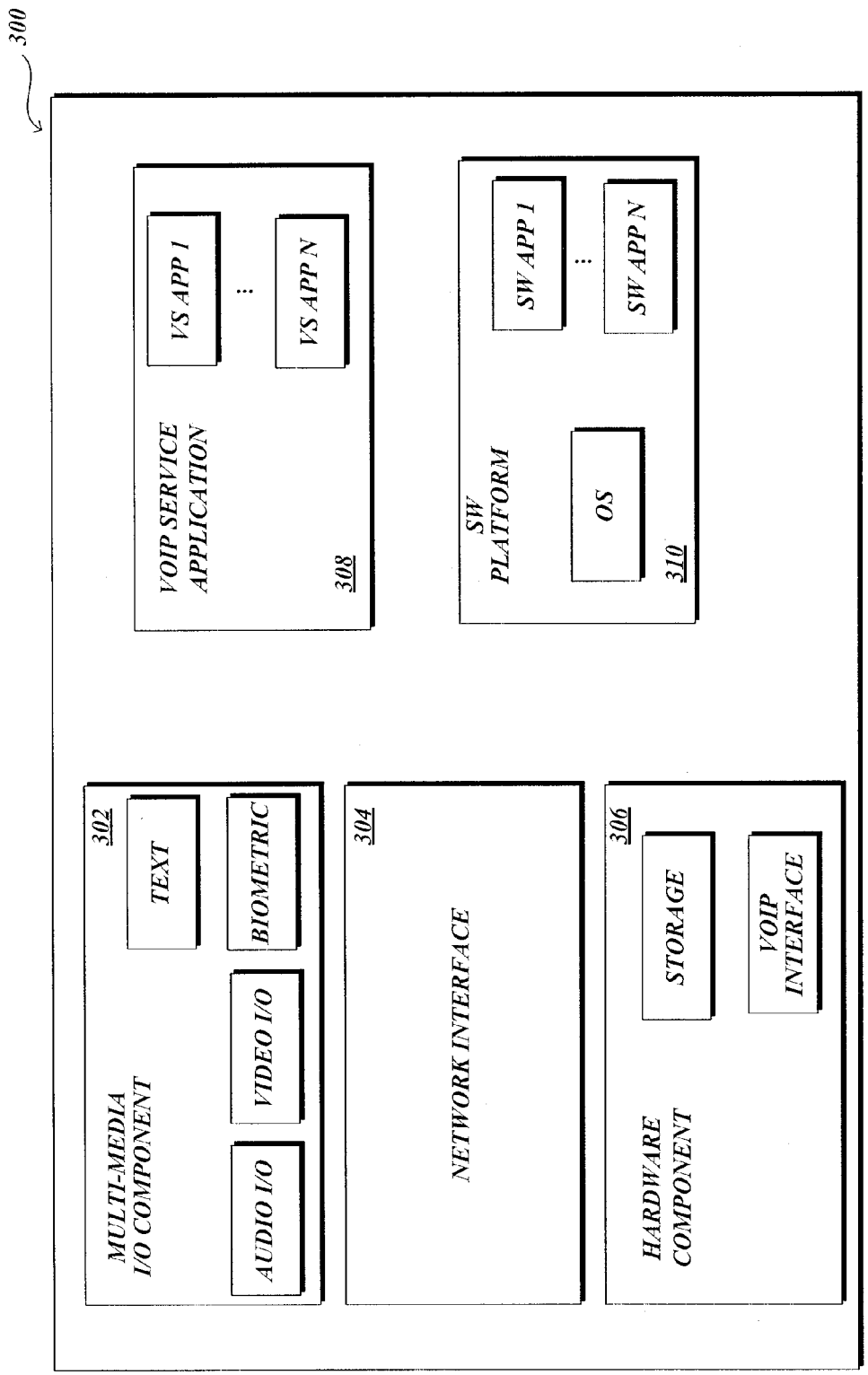
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc.

The multimedia input/output component 302 may include any suitable user input/output components such as a microphone, a video camera, a display screen, a keyboard, user biometric recognition devices, and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications, and to store contextual information related to individuals (e.g., voice profiles, user biometrics information, etc.) associated with the VoIP client in which the device is included. In one embodiment, the hardware component 306 may include a VoIP interface card which allows a non-VoIP client device to transmit and receive a VoIP conversation.

The device 300 may further include a software platform component 310 for the operation of the device 300 and a VoIP service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

Figure 4:
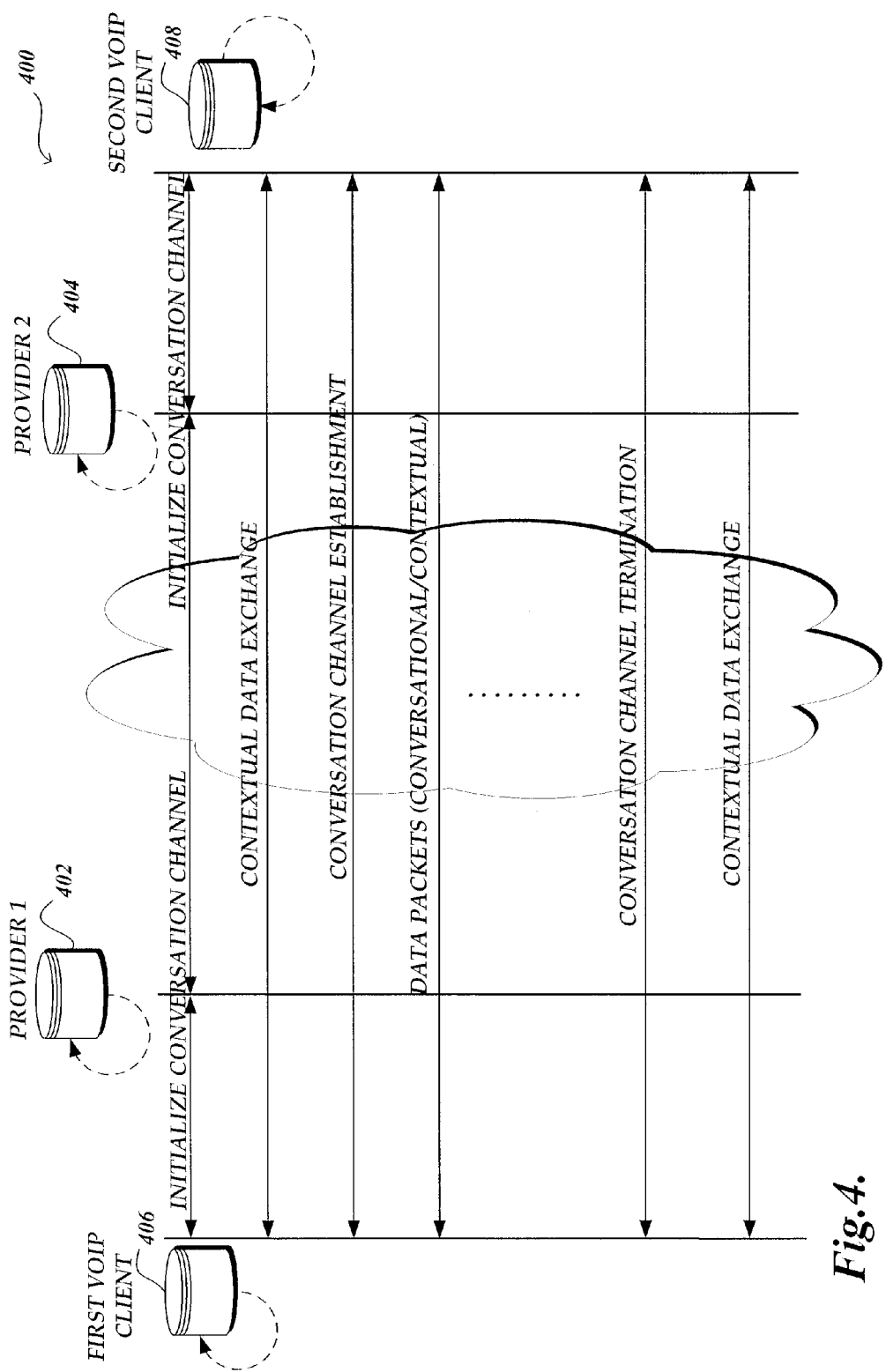
FIG. 4 is a block diagram illustrative of the exchange of data between two VoIP clients over a conversation channel in accordance with an aspect of the present invention.
Figure 5:
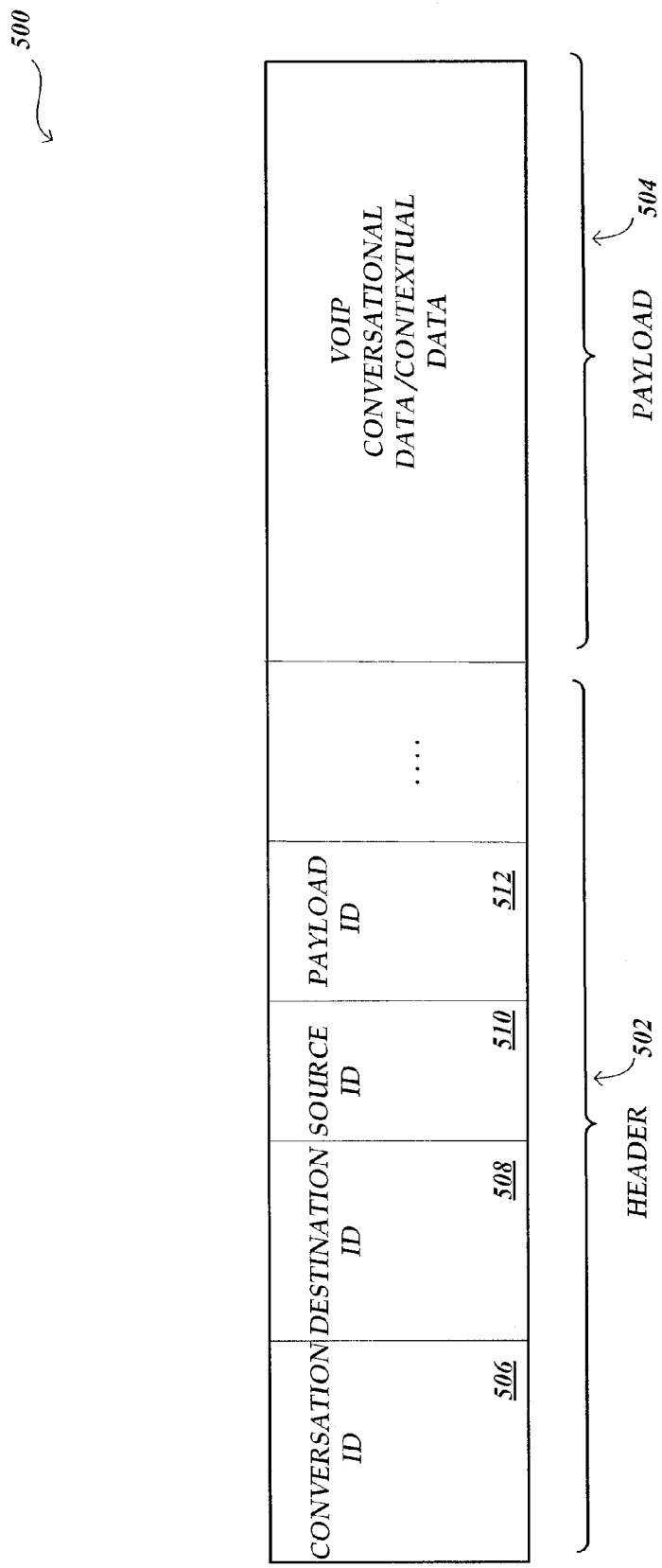
FIG. 5 is a block diagram of a data packet used over a communication channel established in the VoIP environment of FIG. 1.
Figure 6:
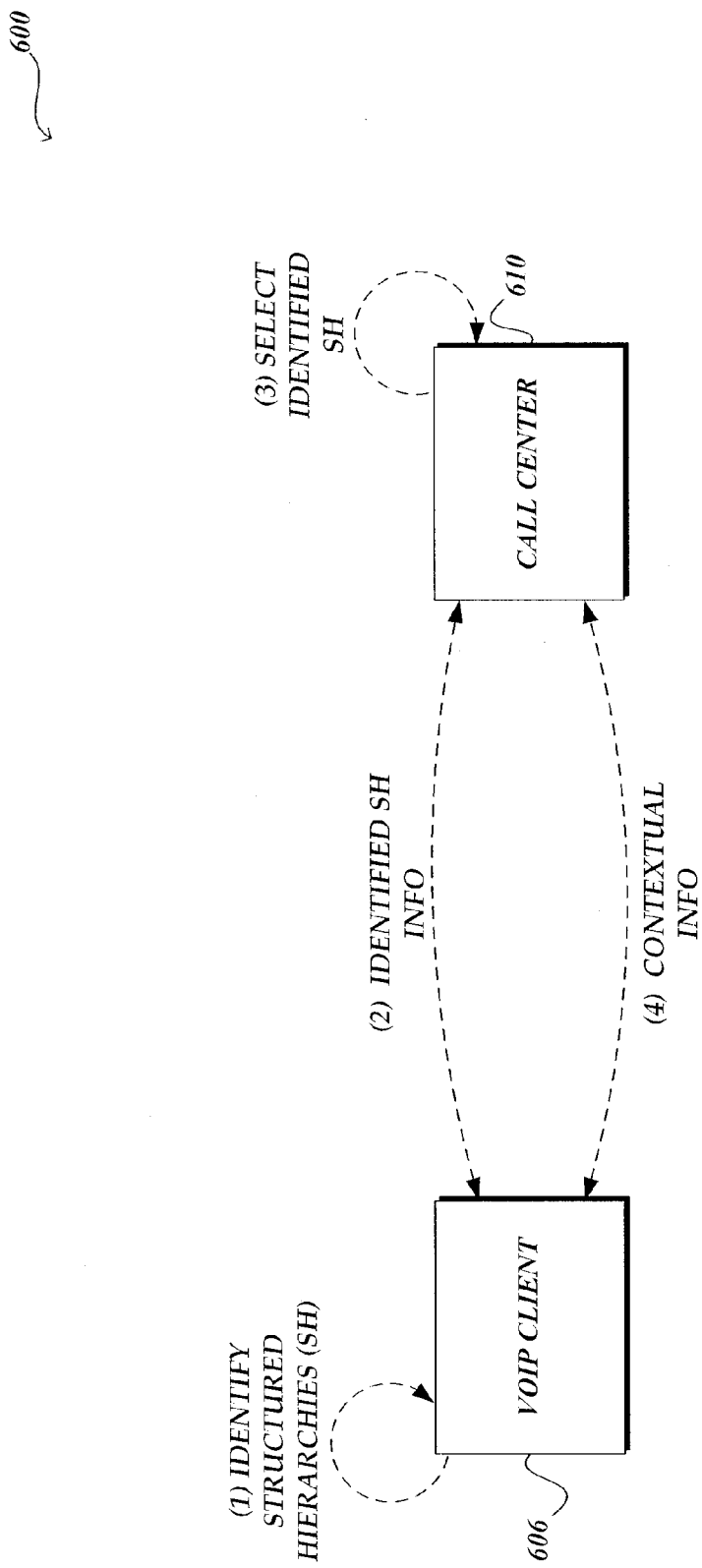
FIG. 6 is a block diagram illustrating interactions between two VoIP clients for transferring contextual information defined by identified structured hierarchies in accordance with an aspect of the present invention.

It is to be noted that FIGS. 4, 5, and 6 are depicted herein to discuss general VoIP conversation channel implementation which is utilized when information necessary for selecting VoIP devices is exchanged as part of contextual information or when the broadcast messages are transmitted to the selected VoIP devices as part of a VoIP conversation.

With reference to FIG. 4, a block diagram illustrative of a conversation flow 400 between VoIP devices of two different VoIP clients over a conversation channel (e.g., VoIP conversation channel), in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams may be exchanged over a Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, consider an example in which, the first VoIP client 406 and the second VoIP client 408 each include only one VoIP device. Accordingly, the discussion provided herein will refer to connection of the two VoIP devices. The individual using the device of the first VoIP client 406 may select or enter the unique VoIP identifier of the client that is to be called. Provider 1 402 receives the request from the device of the first VoIP client 408 and determines a terminating service provider (e.g., Provider 2 404 of the second VoIP client 408) based on the unique VoIP identifier included in the request. The request is then forwarded to Provider 2 404. This call initiation will be forwarded to the device of the second VoIP client 408. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client (Provider 1 406), or a different device/service provider may determine the structure based on the content of the contextual information. In one embodiment, the exchanged contextual information may include information relating to the first VoIP client 406, the device, and the second VoIP client 408.

Available media types, rules of the calling client (i.e., a broadcast call center) and/or the client being called (a recipient client), device information and the like, may also be part of the contextual information that is exchanged during the connection set-up phase. The contextual information may be processed and collected by one of the devices of the first VoIP client 406, one of the devices of the second VoIP client 408, and/or by the VoIP service providers (e.g., Provider 1 402 and Provider 2 404), depending on the nature of the contextual information. In one embodiment, the VoIP service providers 402, 404 may add/delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail below, the data packets, including conversation data packets and contextual data packets, are communicated over the established conversation channel between the connected devices.

In one embodiment, conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain the information necessary to deliver the corresponding data packet to a destination. Additionally, the header 502 may include information utilized in the process of a conversation. Such information may include conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying the type of payload (e.g., conversation or contextual), individual ID (not shown) for identifying the individual to which the conversation data is related, and the like. In an alternative embodiment, the header 502 may contain information regarding Internet protocol versions, and payload length, among others. The payload 504 may include conversational or contextual data relating to an identified conversation such as a broadcast message. As will be appreciated by one of ordinary skill in the art, additional headers may be used for upper layer headers such as a TCP header, a UDP header, and the like.

As will be discussed in greater detail in FIGS. 8A-8E, in one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context), and the like. More specifically, the contextual information may include client preference, client rules, client's location (e.g., user location, device location, etc.), biometrics information, the client's confidential information, VoIP device's functionality, VoIP service provider's information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify and/or delete the VoIP client's contextual data before forwarding the contextual information. For example, the client's confidential information will be deleted by the VoIP service provider associated with that client unless the client authorizes such information to be transmitted. In some cases, a minimal amount of contextual information is transmitted outside of an intranet network.

With reference to FIG. 6, a block diagram 600 illustrating interactions between two VoIP clients for transferring contextual information, in accordance with an embodiment of the present invention, is shown. As with FIG. 4, the example described herein will utilize the scenario in which each client only has one device associated therewith and the connection occurs between those two devices. In one embodiment, devices of a first VoIP client (VoIP Client 606) and a second VoIP client (a call center 610) have established a VoIP conversation channel. It may be identified which structured hierarchies will be used to carry certain contextual information by VoIP Client 606. The information regarding the identified structured hierarchies may include information about which structured hierarchies are used to carry the contextual information, how to identify the structured hierarchy, and the like. Such information will be exchanged between VoIP Client 606 and the call center 610 before the corresponding contextual information is exchanged. Upon receipt of the information identifying which structured hierarchy will be used to carry the contextual information, the call center 610 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to the call center 610.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchy, the call center 610 is expecting to receive a data stream in which data packets corresponding to the data stream are defined according to the identified structured hierarchies. VoIP Client 606 can begin sending contextual information represented in accordance with the identified structured hierarchies. In one embodiment, the call center 610 starts a data binding process with respect to the contextual information. For example, instances of the identified structured hierarchies may be constructed with the received contextual information.

Figure 7A:
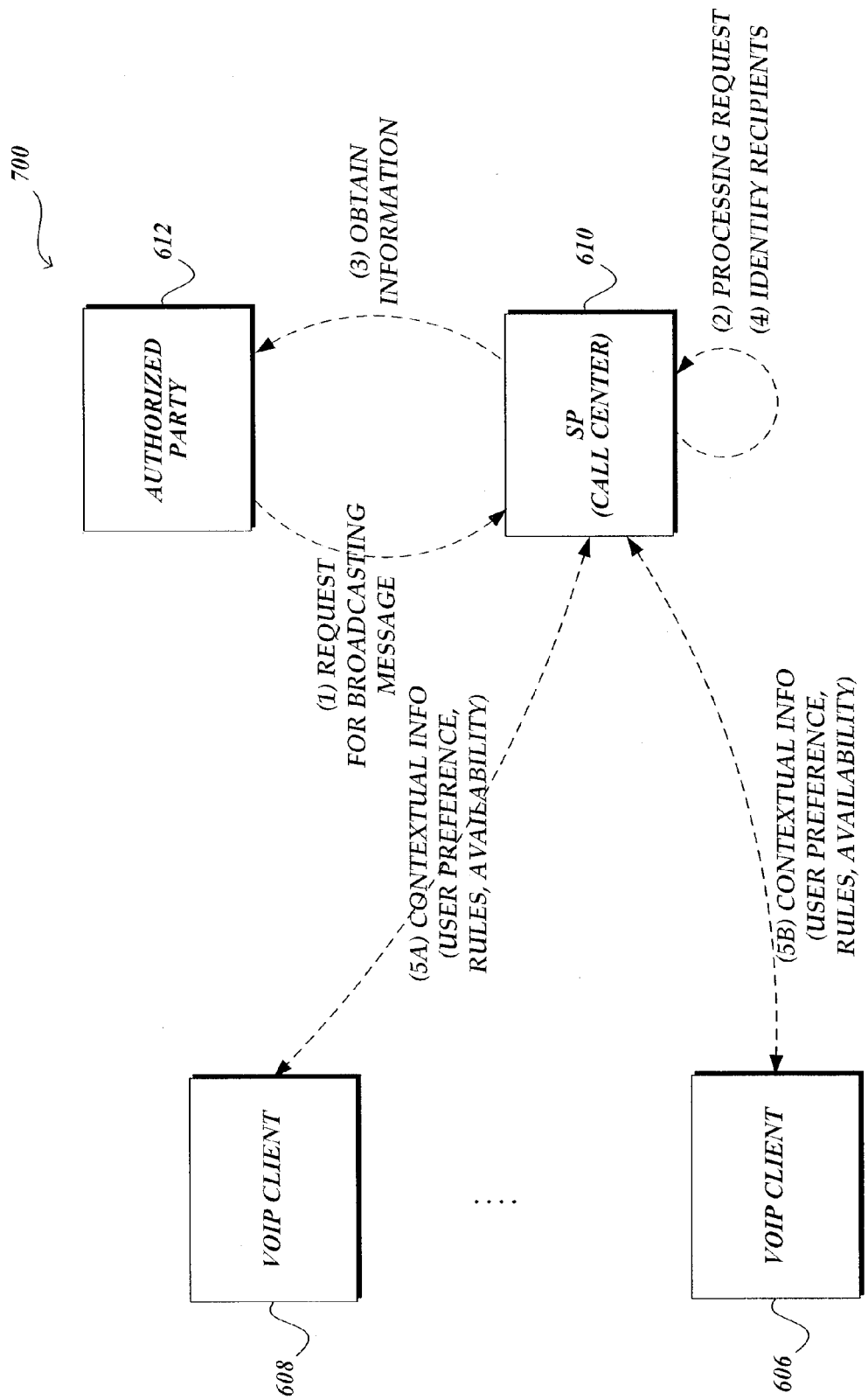
FIGS. 7A-7B are block diagrams illustrating interactions among VoIP entities for selecting devices for broadcast messages in accordance with an aspect of the present invention.
Figure 7B:
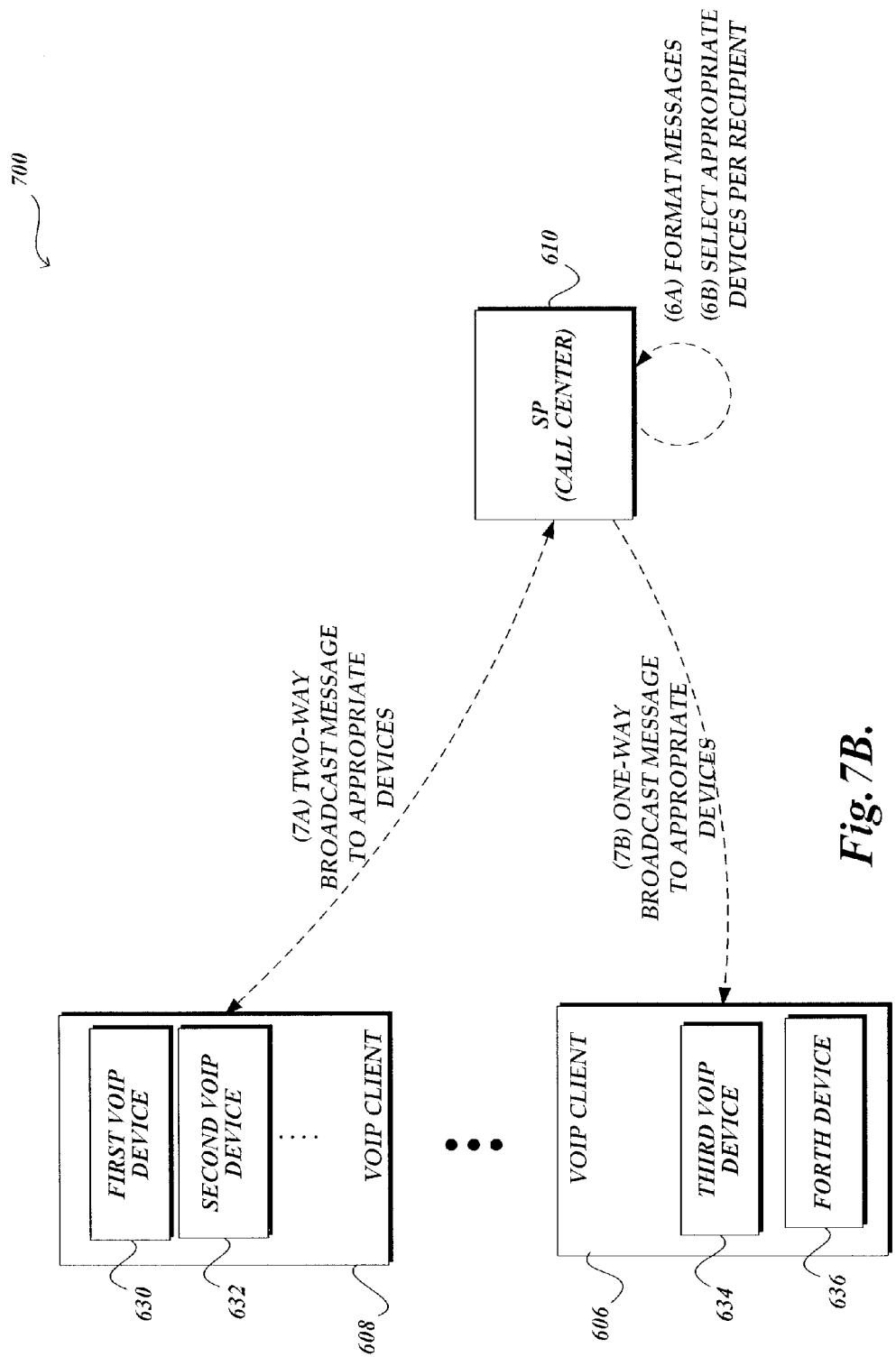

FIGS. 7A-7B are block diagrams 700 illustrating broadcasting a message to selected VoIP devices of VoIP entities in accordance with an embodiment of the present invention. In one embodiment, the VoIP entities may include VoIP clients, VoIP service providers for the clients, third party service providers, and the like. For discussion purposes, assume that a call center 610 is responsible for broadcasting emergency messages to clients 606, 608 in one geographic area. The call center 610 can create an emergency message upon detection of an emergency such as a cable line down due to a hurricane. Likewise, the call center can formulate an emergency message upon receipt of a request from an emergency broadcast organization (e.g., fire station, Federal Emergency Management Agent (FEMA), etc.) to broadcast a particular emergency message. In one embodiment, the emergency broadcast organizations have been pre-authorized to broadcast such emergency message. The call center and the emergency broadcast organizations may have a prearranged agreement as to the scope of recipient clients, priority of clients, priority of messages, etc. It is to be understood that, although examples discussed FIGS. 7A-7B are generally focused on an emergency broadcast message, it is contemplated that an originator or a propagator can broadcast any type of messages to recipient VoIP clients over the VoIP communication channels.

With reference to FIG. 7A, in one embodiment, an authorized party 612 may send to Service Provider (SP) 610 a request that the SP 610 broadcast a message. SP 610 may be a service provider on premises (e.g., part of a client if the client is a corporation) or a service provider off premises (an external service provider). As will be described in greater detail below, SP 610 may be any VoIP related service provider, including a call center, a VoIP service provider, and the like. SP 610 may process the request and send a response to obtain necessary information from the authorized party 612. For example, SP 610 may need to have more information as to which group of clients should be notified first, with what level of detail, for how long, etc. SP 610 identifies an initial group of recipients based on the obtained information. Subsequently, SP 610 exchanges contextual information with its clients 608, 606, including, but not limited to, device information, recipient profile information, recipient rules, etc. In one embodiment, several broadcast messages may be generated for a client and stored in a queue based on a schedule.

For discussion purposes, assume that a city emergency center contacts a call center for an emergency broadcast about a flood in a river. Upon receipt of the request, the call center composes the content of a message (e.g., flood warning) with an area map. The call center may need additional information, for example profile information of recipient clients, a set of rules indicating which group of recipient clients should be notified first, with what level of detail, a current bandwidth of the call center, etc. The call center may obtain such necessary information from the city emergency center or its local storage. Based on this information, the call center may identify several groups of recipient clients who should receive the flood warning message. A first group of clients may be clients traveling or residing near the flooded area. A second group of clients may be city employees who should decide immediately which roads should be closed and used as a detour.

In an illustrative embodiment, SP 610 further collects information from the identified group of recipients, such as device information (functionality, type, and applications), recipient profile information, a set of recipient rules, etc. Specifically, each recipient may have different types of devices which may or may not have the functionality and capability necessary to receive or process the broadcast message. As discussed in FIG. 4, before the devices of VoIP Client 608 and SP 610 begin to exchange conversation, contextual information including the above mentioned information may be exchanged. Further, SP 610 can request the information necessary for selecting devices and obtain the information from a third party SP. SP 610 and the third party may exchange more information, including the client's contextual information relating to the VoIP Client 606, 608. In an illustrative embodiment, SP 610 obtains (or collects) any readily available contextual information, for example, previously obtained contextual information related to VoIP Client 606, 608, devices, previous broadcast service history, and the like, from its database.

Referring to FIG. 7B, SP 610 formulates messages for broadcast. In one embodiment, once a broadcast message is formulated, SP 610 may determine necessary functionality and applications in a recipient device in order to receive or process the formulated broadcast message. In addition, a particular type of recipient device suitable for receiving the formulated broadcast message may be determined. Based on this information and other relevant information, SP 610 selects appropriate VoIP devices suitable for the formulated broadcast message. For example, if Bob, a city emergency employee, who is driving, has a mobile phone, a laptop, and a pager with him, the call center may select the laptop to transmit the flood warning audio message with an area map via a VoIP communication channel because the laptop is the only device with a proper display unit for the area map.

It is to be understood that either a two-way or a one-way VoIP communication channel can be established between VoIP clients and SP 610 for transmitting a broadcast message. Returning back to the flood emergency example, upon receipt of the flood warning message, Bob can send an acknowledgment of the broadcast message to the call center over a two-way VoIP communication channel. In this example, the two-way VoIP communication channel enables Bob to further engage in a conversation with a contact (e.g., agent, Interactive Voice Recognition System (IVRS), operator, etc.) of SP 610 while the broadcast message and the acknowledgment are being exchanged.

In addition, a multi-party VoIP communication channel can be established for exchanging the broadcast message, the acknowledgment, and VoIP conversations among several VoIP clients and SP 610. In the above example, Bob may wish to contact a hospital while Bob is communicating with the call center. The call center may route the communication channel connection to a hospital, resulting in Bob and the hospital having an established communication channel. In some cases, the call center, the hospital, and Bob may be connected via a multi-party VoIP communication channel.

As shown in FIG. 7B, after First VoIP device 630 and Second VoIP device 632 of VoIP Clients 608 are selected for a broadcast message, SP 610 transmits broadcast messages to First VoIP device 630 and Second VoIP device 632 over a proper VoIP communication channel. If a two-way communication channel is used, First VoIP device 630 or Second VoIP device 632 may respond to the broadcast message by sending a confirmation of receipt (positive acknowledgment), sending a failure of receipt (negative acknowledgment), sending a request to communicate, etc., over the two-way communication channel. Likewise, one device of VoIP Client 606 may receive broadcast messages from SP 610 over a one-way communication channel. More particularly, Third VoIP device 634 of VoIP Clients 608 is selected for the broadcast message and subsequently receives the broadcast message over a one-way communication channel.

As will be described in greater detail below, it is contemplated that structured hierarchies are utilized to carry contextual information (contextual data packets) between several VoIP entities in this illustrative embodiment. SP 610 processes the contextual information to identify what information will be further collected and which appropriate source will be contacted or queried, to obtain the identified information.

In some instances, several broadcasts may be necessary. With each broadcast, the size or scope of the group of recipient clients and/or content of the messages may vary. Contextual information related to the broadcast message may include a set of rules which specify how to format, schedule, and transmit messages to each group of recipient clients. For example, assume that a flood area map including the road closure information is to be provided along with flood warning messages to road crews, emergency employees, and/or police because the road closure information is continuously changing. The call center may periodically generate flood warning messages including an updated area map showing current road conditions and select those devices which can display the area map and the flood warning messages.

In one embodiment, the structured hierarchies may be defined by Extensible Markup Language (XML). However, it is to be appreciated that the structured hierarchies can be defined by any language suitable for implementing and maintaining extensible structured hierarchies. Generally described, XML is well known for a cross-platform, software and hardware independent tool for transmitting information. Further, XML maintains its data as a hierarchically-structured tree of nodes, each node comprising a tag that may contain descriptive attributes. Typically, XML namespace is provided to give the namespace a unique name. In some instances, the namespace may be used as a pointer to a centralized location containing default information about the namespace.

In accordance with an illustrative embodiment, while the communication channel is being established, VoIP Client 606 may identify a XML namespace for contextual information. For example, the XML namespace attribute may be placed in the start tag of a sending element. It is to be understood that XML namespaces, attributes, and classes illustrated herein are provided merely as an example of structured hierarchies used in conjunction with various embodiments of the present invention. After SP 610 receives the XML namespace information, the VoIP Client 606 transmits a set of contextual data packets, defined in accordance with the identified XML namespace, to SP 610. When a namespace is defined in the start tag of an element, all child elements with the same prefix are associated with the same namespace. As such, SP 610 and VoIP Client 606 can transmit contextual information without including prefixes in all the child elements, thereby reducing the number of data packets transmitted for the contextual information. More particular examples of the structured hierarchies are depicted in greater detail in FIGS. 8A-8E.

With reference to FIGS. 8A-8E, block diagrams illustrative of various classes and attributes of structured hierarchies corresponding to VoIP contextual information are shown. The VoIP contextual information exchanged between various VoIP entities (e.g., clients, service providers, etc.) may correspond to a VoIP namespace 800. In one embodiment, the VoIP namespace 800 is represented as a hierarchically structured tree of nodes, each node corresponding to a subclass that corresponds to a subset of VoIP contextual information. For example, a VoIP namespace 800 may be defined as a hierarchically structured tree comprising a call basics class 802, a call contexts class 810, a device type class 820, a VoIP client class 830, and the like.

Figure 8A:
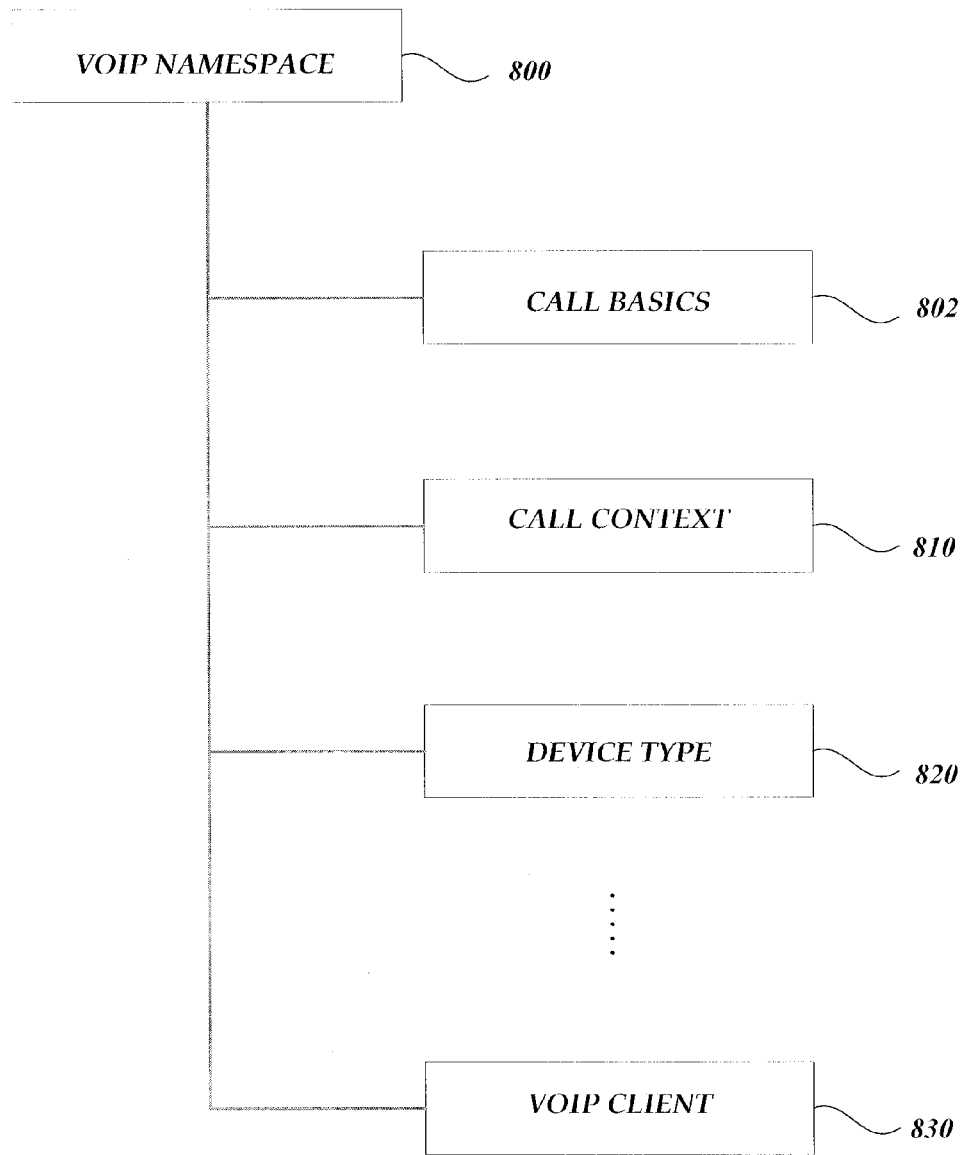
FIGS. 8A-8E are block diagrams illustrative of various attributes and classes of structured hierarchies corresponding to VoIP contextual information in accordance with an aspect of the present invention.
Figure 8B:
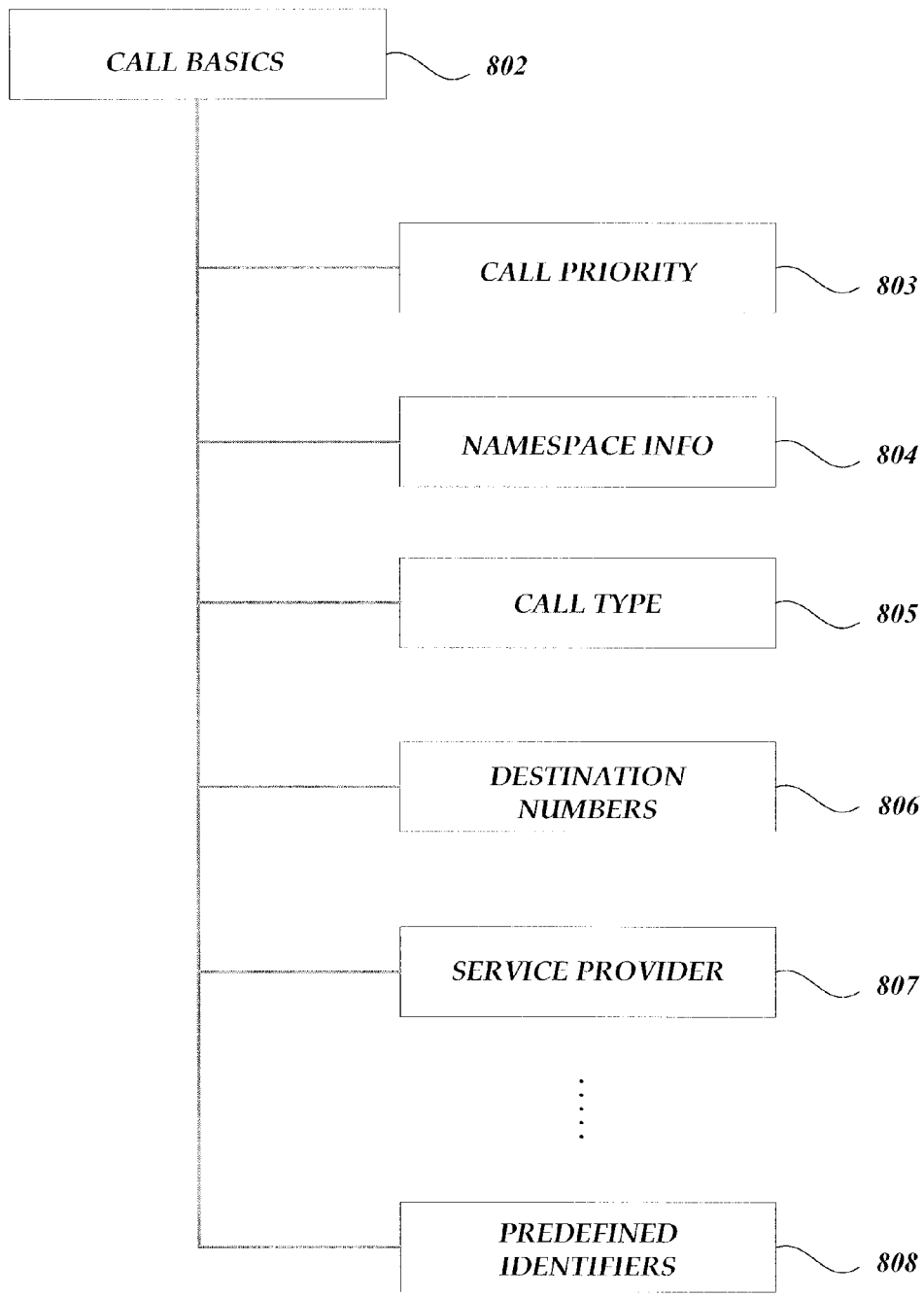

With reference to FIG. 8B, a block diagram of a call basics class 802 is shown. In an illustrative embodiment, the call basics class 802 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's VoIP ID number), destination numbers (e.g., callees' VoIP ID numbers, or telephone numbers), call connection time, VoIP service provider related information, and/or ISP related information, such as IP address, MAC address, namespace information, and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer-to-computer communication, a computer to POTS device communication, and so forth. In one embodiment, the contextual information relating to a conversation channel connection may include predefined identifiers which represent emotions, sounds (e.g., "ah," "oops," "wow," etc.), and facial expressions in graphical symbols. In one embodiment, a call basics class 802 may be defined as a subtree structure of a VoIP namespace 800, which includes nodes such as call priority 803, namespace information 804, call type 805, destination numbers 806, service provider 807, predefined identifiers 808, and the like.

Figure 8C:
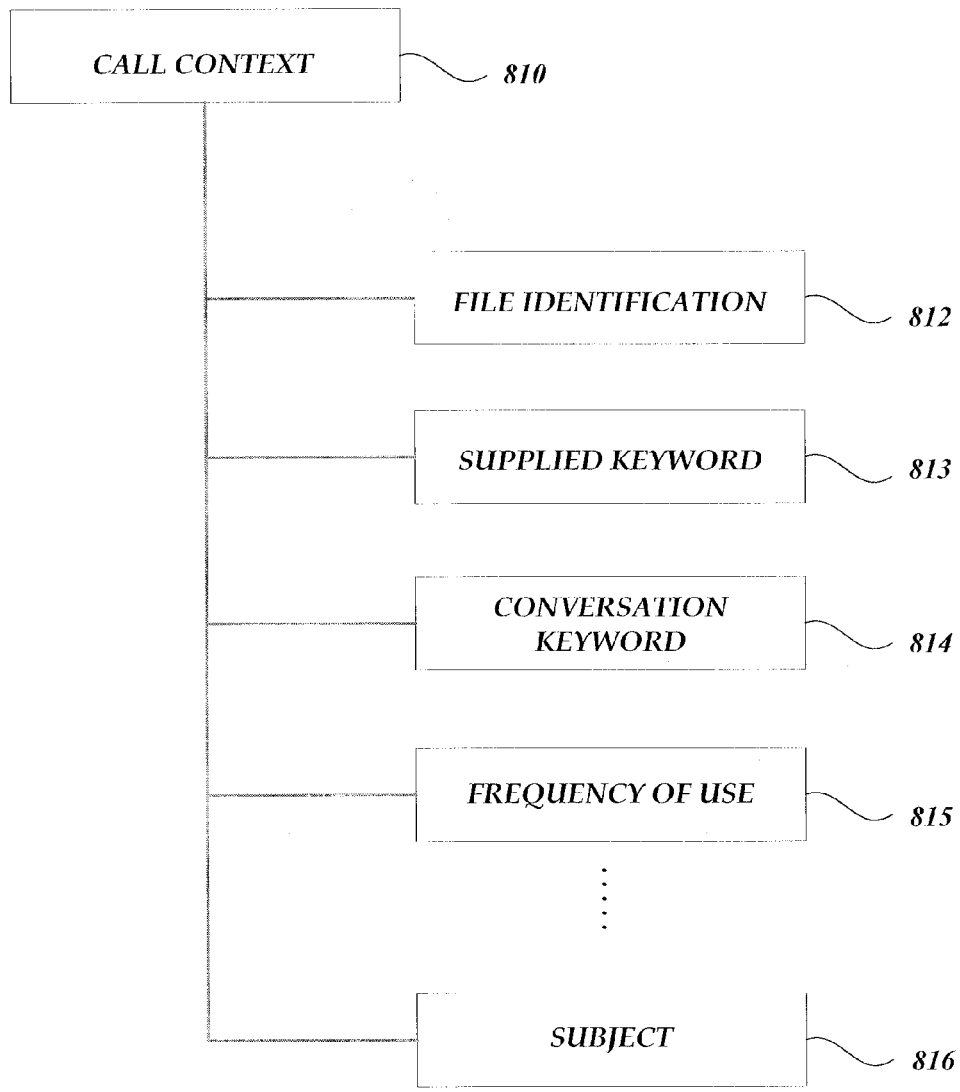

With reference to FIG. 8C, a block diagram of a call contexts class 810 is shown. In one embodiment, a subset of VoIP contextual information relating to conversation context may correspond to the call contexts class 810. The contextual information relating to conversation context may include information such as keywords supplied from a client, a service provider, network, etc., identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation). The contextual information relating to conversation context may further include information relating to encryption (whether and/or how to encrypt contextual information) and subject of service (a type or nature of the service when a client requests such service from a service provider), among many others. In accordance with an illustrative embodiment, a call contexts class 810 may be defined as a subtree structure of a VoIP namespace 800 that includes nodes corresponding to file identification 812, supplied keyword 813, conversation keyword 814, frequency of use 815, subject 816, and the like.

Figure 8D:
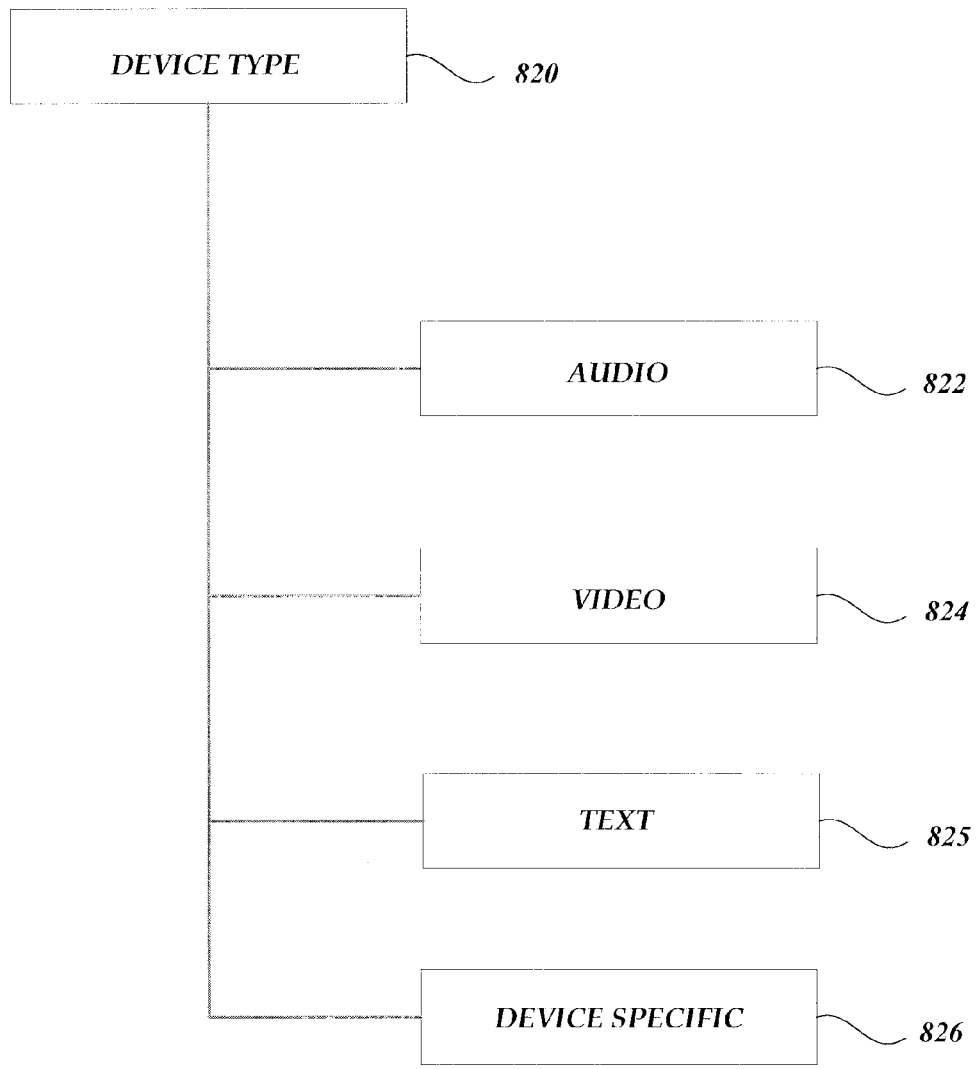

With reference to FIG. 8D, a block diagram of a device type class 820 is depicted. In one embodiment, a device type class 820 may correspond to a subset of VoIP contextual information relating to a VoIP client device used for the conversation channel connection. The subset of the VoIP contextual information relating to the VoIP client device may include audio related information that may be needed to process audio data generated by the VoIP client device. The audio related information may include information related to the device's audio functionality and capability, such as sampling rate, machine type, output/input type, microphone, digital signal processing (DSP) card information, and the like. The subset of the VoIP contextual information relating to the VoIP client device may include video related information that may be needed to process video data generated by the VoIP client device. The video related information may include resolution, refresh, type, and size of the video data, graphic card information, and the like. The contextual information relating to VoIP client devices may further include other device specific information such as type of the computer system, processor information, network bandwidth, wireless/wired connection, portability of the computer system, processing settings of the computer system, and the like. In an illustrative embodiment, a device type class 820 may be defined as a subtree structure of a VoIP namespace 800, which includes nodes corresponding to audio 822, video 824, text 825, device specific 826, and the like.

Figure 8E:
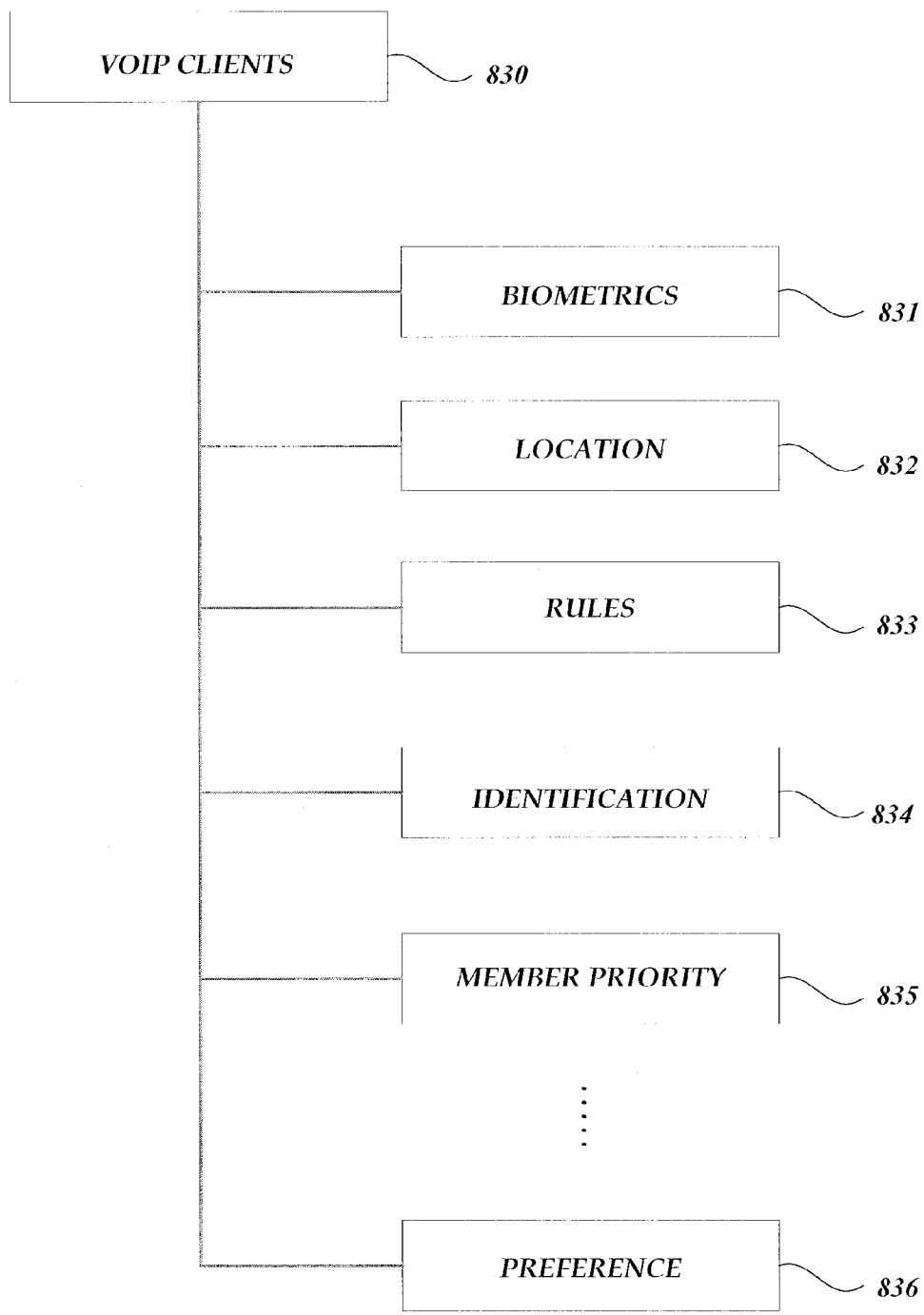

FIG. 8E depicts a block diagram of a VoIP client class 830. In accordance with an illustrative embodiment, a VoIP client class 830 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., a fingerprint) related to biometric authentication, user stress level, user mood, etc. The subset of the VoIP contextual information relating to the VoIP client may include assigned phone number, user contact information (such as name, address, company, and the like), rules defined by the client, user preferences, digital rights management (DRM), a member rank of an individual user in an organization, priority associated with the member rank, and the like. The priority associated with the member rank may be used to assign priority to the client for a conference call. In one embodiment, a VoIP client class 840 may be defined as a subtree structure of a VoIP namespace 800, which includes nodes corresponding to user biometrics 831, location 832, rules 833, user identification 834, member priority 835, preference 836, and the like.

Figure 9:
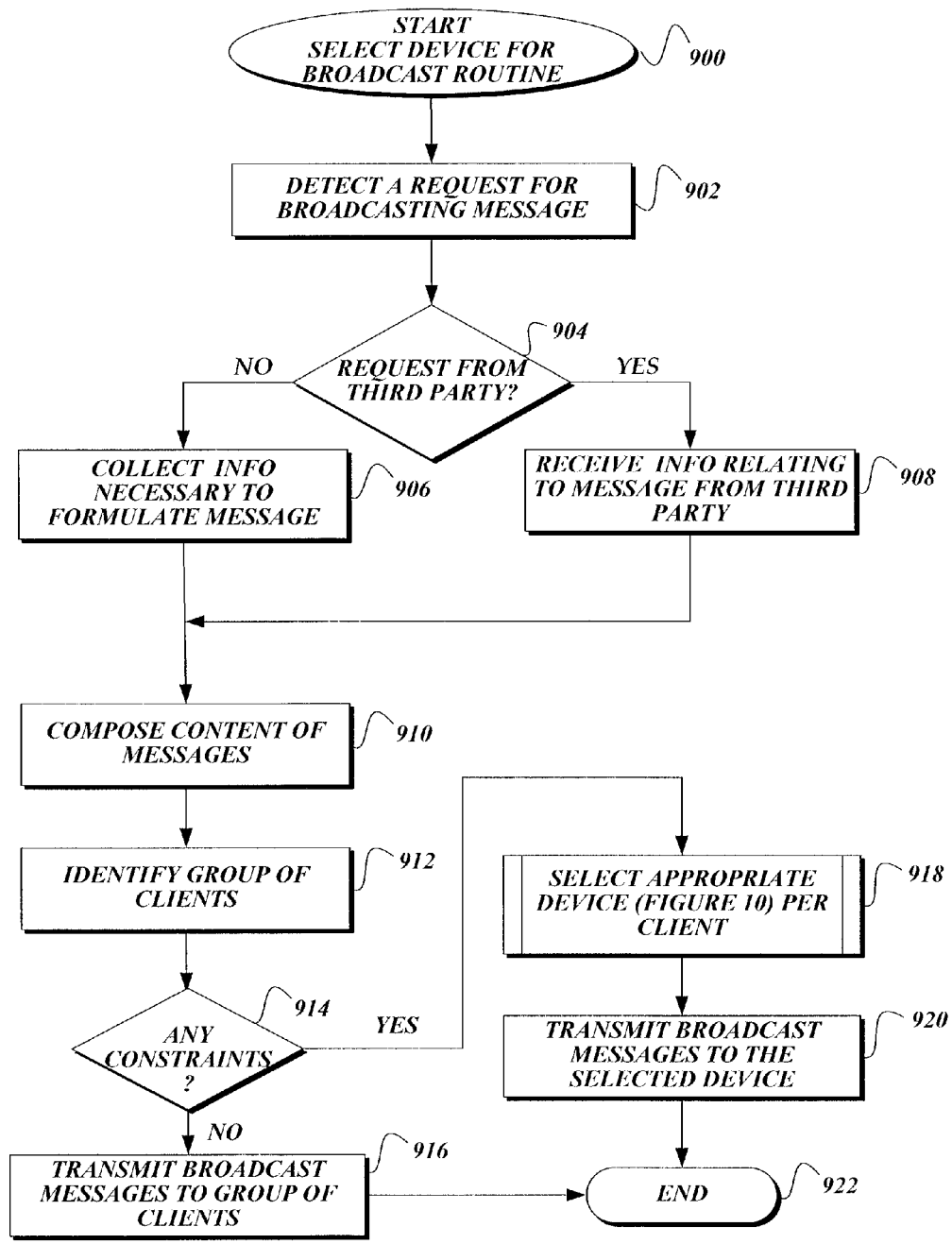
FIG. 9 is a flow diagram illustrating a routine for broadcasting messages to selected devices of identified recipients in accordance with an aspect of the present invention.

FIG. 9 is a flowchart illustrating a routine 900 for broadcasting messages to selected devices in accordance with an embodiment of the present invention. For the purpose of discussion, assume that a service provider (a call center, a broadcaster, etc.) is configured to propagate, broadcast, or forward messages to its recipient clients via a VoIP communication channel. Beginning at block 902, the service provider may detect a request for broadcasting messages. The request for broadcasting messages may be received from an authorized third party such as an Emergency Broadcast third party, other service providers (e.g., e-commerce service provider), a client, etc. Further, the request for broadcasting messages can be triggered upon detection of certain events in the service provider. At decision block 904, a determination is made as to whether the request is from a third party. If it is determined at decision block 904 that the request is triggered by some events in the service provider, at block 906 the service provider collects information necessary to formulate messages. In one embodiment, the service provider may have a predefined set of events which will trigger a broadcast message to its clients. For example, the service provider may have predefined a set of rules specifying that if a possible cable failure event is detected, it will trigger a broadcast message to a group of clients who can be affected by the cable failure. If it is determined that the request is from the third party, at block 908, the service provider receives information relating to a message to broadcast from the third party. For example, a department store may wish to broadcast promotional messages to people in nearby towns. The department store may request to broadcast promotional messages to an unspecified group of people whoever can receive and read the promotional messages. For another example, an Emergency Broadcast third party may request to broadcast emergency messages.

At block 910, the content of the message may be composed based on collected or received information. At block 912, based on client criteria, a group of clients (recipient clients) may be identified to receive the composed message relating to the request for broadcasting messages. As will be appreciated by one of ordinary skill in the art, several messages may be composed for different groups of recipient clients. For example, a service provider decides to inform its clients about a temporary bandwidth problem, but decides to broadcast a different message to its employees that instructs the employees not to burden the system's bandwidth. In this case, a first message may be related to a temporary bandwidth problem and a second message may be related to an instruction not to burden the system's bandwidth. Based on the content of the messages, two groups (a general client group and an employee group) may be identified. In addition, if a third party requested to broadcast a message, the third party may provide information relating to identifying a group of recipient clients to whom the message is to be sent. For example, each EB third party may have different levels or sub-levels of priority based on a current emergency situation, an individual user's member ranking, or the like. In this example, the group of recipient clients will be identified based on the priority information.

At decision block 914, for each identified recipient client, a determination is made as to whether there is any constraint related to broadcasting the composed message to the identified recipient client. The constraint may be information including, but not limited to, a service provider's bandwidth, a set of rules (of service provider, recipient, third party, etc.) defined for broadcasting a message, preference of the recipient client, the third party request, capability and functionality of a recipient device, etc. The constraint may be used to select an appropriate device(s). It is contemplated that the service provider may have some logic to resolve any conflicts among the constraints received from various sources.

If it is determined at decision block 914 that there is no constraint related to broadcasting the composed messages, at block 916 no specific device will be selected for broadcasting and thus the composed message will be broadcast to all available devices of the recipient client.

As will be readily appreciated, although it can be assumed that most recipient clients may have a device which is capable of receiving the formulated message and processing the formulated message, selecting an appropriate device for the message may be practical for many reasons. For example, if the system has limited bandwidth, only a certain number of messages can be sent out at a given time. If the message is selectively sent to appropriate devices, the system can fully utilize its bandwidth by successfully broadcasting messages to recipient clients, thereby eliminating a need for repeated broadcasting. For another example, the recipient client can be properly informed via an appropriate device rather than having to check several devices which may or may not provide proper messages due to their lack of capability.

Figure 10:
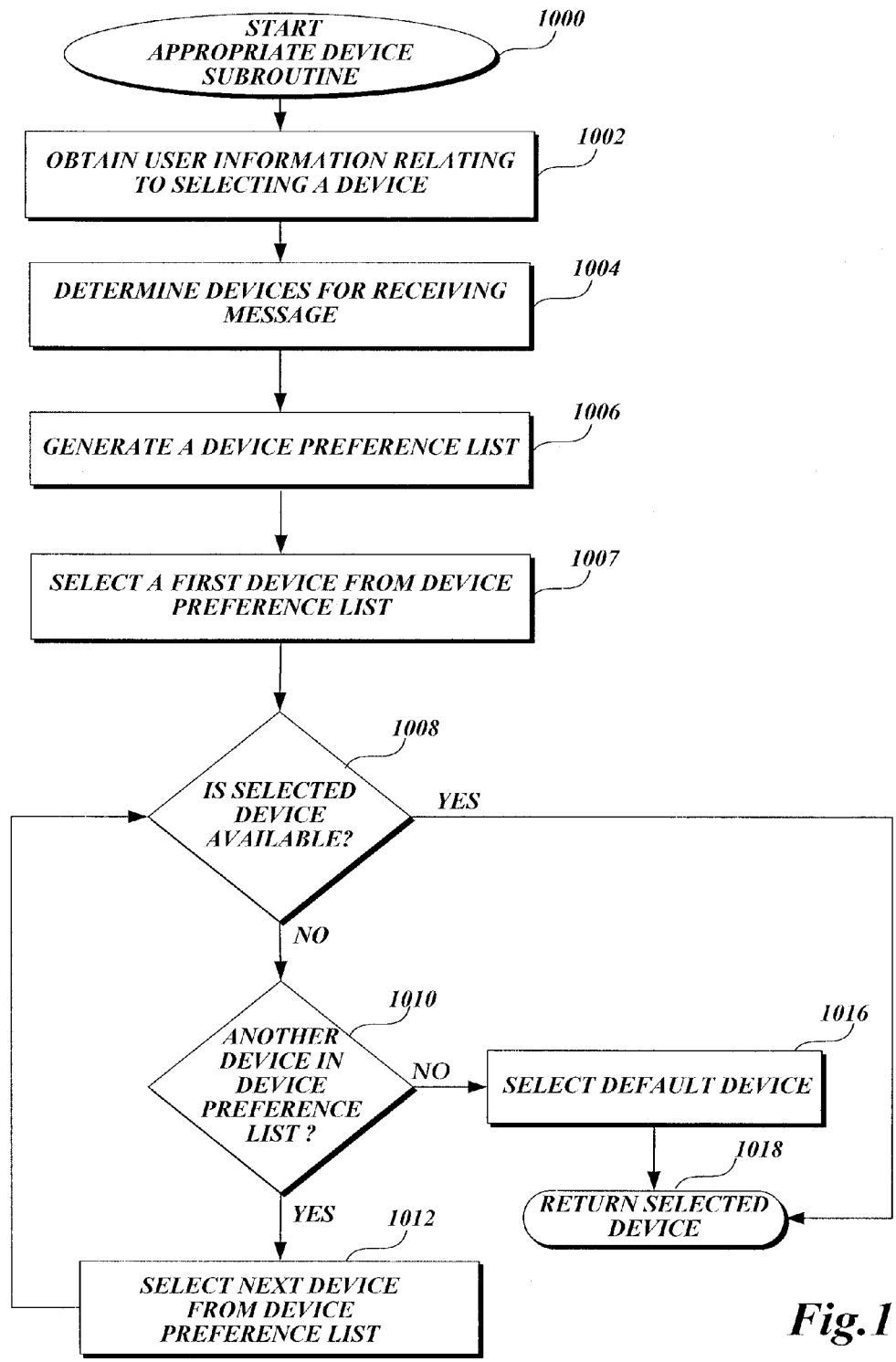
FIG. 10 is a flow diagram illustrating a subroutine utilized in FIG. 9 for selecting appropriate devices based on specified constraints in accordance with an aspect of the present invention.

If it is determined at decision block 914 that there is any constraint found, at block 918 appropriate devices may be selected for the recipient client via a device selecting subroutine 1000 (FIG. 10). At block 920, the composed broadcast messages may be transmitted to the selected devices. In a particular embodiment, based on the priority information, the composed broadcast messages may be scheduled for an orderly transmission of messages to clients. For example, the service provider has composed content of messages for three different groups having different priority levels. The service provider determines a priority level for each group and, based on the priority level of each group, determines a schedule to transmit a message. As such, the service provider may ensure that clients with a higher priority may be able to receive the broadcast messages before clients with a lower priority. Upon receipt of the broadcast message, any recipient client may send a proper response to the service provider over a digital communication channel. For example, a proper response can be a simple confirmation of receipt of the broadcast message, a request for a service, a request for a conversation, etc. The routine 900 terminates at block 922.

It is to be understood that the embodiments explained in conjunction with the routine 900 are provided merely for example purposes. In one embodiment, a VoIP device may send a request to broadcast a message upon detection of problems without any human interaction. It is to be understood that a group of VoIP devices where a broadcast message is transmitted may be determined based on a set of rules or instructions embedded in the messages. For example, the third party may specify a set of rules indicating that a specific type of VoIP device is to be selected for broadcast. Additionally, a broadcast message may be formulated based on information provided by the third party who has requested to broadcast the messages, and VoIP devices may be determined accordingly. For example, a third party may request to broadcast (or propagate) the message to any VoIP devices located within 4 miles of a geographic location. Subsequently, VoIP devices located within a specified geographic area will be selected for broadcast. In one embodiment, a VoIP device may be designated for forwarding (propagating) a received broadcast message to a group of VoIP devices based on instructions embedded in the received broadcast message. The designated VoIP device may transmit the broadcast message to a recipient device according to the instructions.

FIG. 10 illustrates a block diagram of a subroutine 1000 for selecting appropriate devices for a message in accordance with an embodiment of the present invention. As described in FIG. 9, the service provider may detect a request to broadcast a message and the message is then formulated based on collected/obtained information. For the purpose of discussion, assume that the message was requested to transmit to the most appropriate device for each recipient client, and message format information was exchanged.

Beginning at block 1002, after a group of recipient clients has been identified based on the client criteria, for each recipient client, recipient client information relating to selecting an appropriate device may be obtained. As described above, the recipient client information may include a set of client rules, the recipient client's preference, device information, etc. At block 1004, based on the message format information, it is determined which device of the recipient client is preliminarily appropriate to receive the message. For example, if the message includes images to display, devices which do not have functionality to display images are determined to be inappropriate for the message. Likewise, if the message includes a simple audio recording, devices which have functionality to play audio recording are determined to be preliminarily appropriate for the message.

At block 1006, based on the obtained recipient client information and other relevant information, a device preference list may be generated. In some instances, a single device may be determined to be appropriate to receive the message at block 1004. However, if several devices of a recipient client are determined to be appropriate at block 1004, it may be useful to broadcast a message to the most appropriate device instead of several appropriate devices to avoid redundancy in broadcasting of messages to one recipient client. As will be appreciated by one of ordinary skill in the art, there are various constraints to consider in determining the most appropriate device. One constraint can be the recipient client's preference for the device selection. For example, assume that a recipient client has four devices that are capable of receiving and processing an audio recording message and the recipient client indicated a client preference that a first device is not the most appropriate device to receive broadcast messages since the first device is heavily used for business related VoIP conversation. Another constraint can be a service provider specific constraint, for example, a system bandwidth, service provider preference, or the like. For example, a service provider with a limited bandwidth tries to maximize the bandwidth by sending the message to a device which can receive the message and confirm the receipt without any significant delay. It is to be understood that the above mentioned constraints are provided merely for exemplary purposes. Other constraints, such as group user rules and preferences, authorized third party rules and preferences, or the like, can be considered when an appropriate device is being determined.

In an illustrative embodiment, in order to make a device preference list for a recipient client, a preference score may be utilized to represent a degree of desirability based on various constraints and associated weights. It is to be understood that the service provider may have predefined logic for assigning a preference score to a device in the device preference list, based on the constraints, to determine the most appropriate device.

At block 1007, a first device, with the highest preference score from the device preference list, is selected. At decision block 1008, a determination is made as to whether the selected device is available to receive the composed message. If it is determined at decision block 1008 that the appropriate device is available to receive a message, at block 1018, the selected message is returned and the subroutine 1000 completes.

If it is determined at decision block 1008 that the selected device is not available to receive a message, at decision block 1010 a determination is made as to whether another device, with a next highest preference score is found in the device preference list. If it is determined at decision block 1010 that there are no more devices in the device preference list, at block 1016 a default device is selected. The default device may be specified in the client preference information or randomly selected. If it is determined at decision block 1010 that another device with next highest preference score is found in the device preference list, at block 1012 the device with next highest preference score is selected. The subroutine returns to decision block 1008 and repeats the above mentioned steps until a selected device is available or no device is left in the device preference list.

After determining the selected device to be available (decision block 1008) or selecting a default device (block 1016), the subroutine returns the identification of the selected device and completes at block 1018.

It is to be understood that the routine 900 and the subroutine 1000 are described herein as examples. In one embodiment, instead of identifying the recipient clients, appropriate devices (capable devices) of any recipient clients, which are capable of receiving and processing the message, are identified. The message may be transmitted to the identified capable devices without identifying each recipient client. In this scenario, one recipient client can receive the same message via multiple devices. Further, if the number of identified capable devices is significantly small, the message may be reformulated in a downgraded format. For example, the message including media information (e.g., audio recording and images) may be downgraded to include only voice information (e.g., audio recording). Generally, more devices may have functionality to play audio recording than to display images. In one embodiment, a desirable number of the identified capable devices is predefined. Whenever the number of identified capable devices is less than the desirable number, a certain level of downgrade in a message format may be determined and the broadcast message is reformulated accordingly.

In another embodiment, appropriate devices are designated by the recipient client or the third party. In this embodiment, messages can be formatted appropriately for the device designated to receiving them. For example, in the client profile, a recipient client has designated a certain device for receiving an emergency message. That device may be selected as an appropriate device for the recipient client when there is an emergency. If the designated device has limited functionality (e.g., only able to communicate simple text information), the message can be formulated accordingly. In some cases, simple text information may not be enough to notify a client of a certain event. In such a case, simple text information may be sent to the appropriate device and a more detailed message may be subsequently sent to another device of the same client that has the applications or functionality necessary to process and/or display the detailed message. In this example, the simple text message may be used to notify the client to access another device which has received the detailed messages.

Further, if the appropriate device is not available, instead of selecting a default device, a set of rules specifying alternative paths for the client may be retrieved, or obtained. For example, the service provider may identify another recipient client that can repeatedly forward the message to the recipient client. Alternatively, the service provider may identify a recipient client which can walk to inform other clients due to proximity in geographic location. For example, Bob can walk over to Sara's office and tell her about the message.

In one embodiment, if a message(s) is to be periodically transmitted to a recipient client in order to ensure that the recipient client receives at least one message via its devices, several messages may be formulated and scheduled accordingly. In addition, broadcast messages can be scheduled based on priority information of the recipient clients. In another embodiment, in order to ensure that a recipient client receives at least one message, a second message may be designated to a second appropriate device of the client within a predetermined period after a first message has been sent to a first appropriate device of the client.

Figure 11:
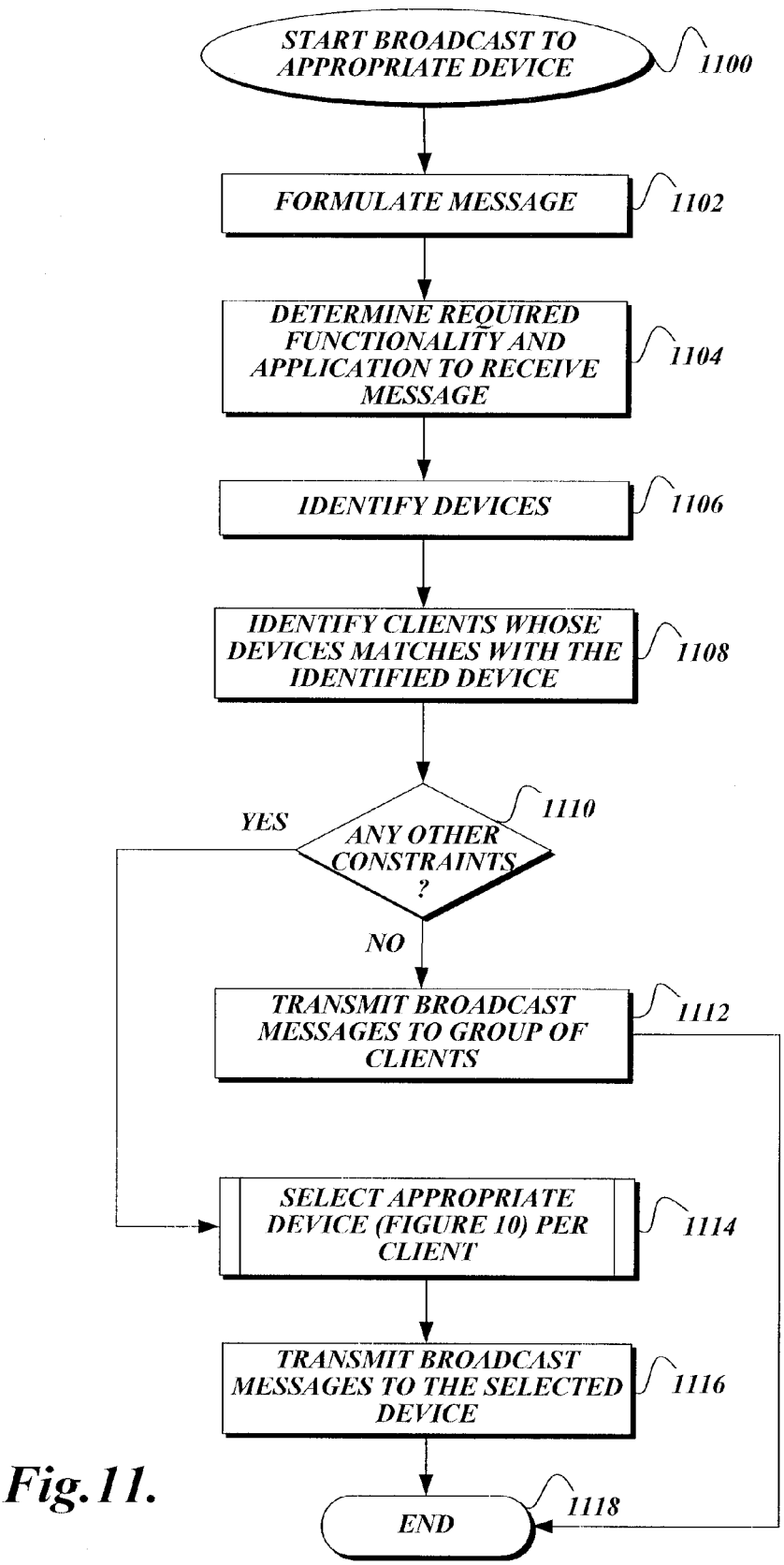
FIG. 11 is a flow diagram illustrating another routine for broadcasting messages to selected devices in accordance with an aspect of the present invention.

FIG. 11 is a flowchart illustrating another routine 1100 for broadcasting messages to one or more appropriate devices in accordance with an embodiment of the present invention. As with FIG. 9, assume that the service provider may detect a request for broadcasting messages either from a third party or triggering events and subsequently, collects information necessary to formulate messages, including, but not limited to, the content of the message, priority information, scheduling information, duration of the broadcast, escalating message information, etc., from various sources. Further assume that the service provider has some logic to resolve any conflict among the information received from various sources.

At block 1102, one or more messages may be formulated based on collected or received information. At block 1104, for each formulated message, recipient device constraint, such as any required functionality and/or capability of a recipient device, may be determined for receiving or processing the formulated message. At block 1106, the devices suitable to receive the formulated messages may be identified based on the required functionality and capability. At block 1108, those recipient clients whose devices are equivalent to the identified device or have features comparable to the identified device, may be identified. In one embodiment, the service provider may have information about devices or types of devices generally used by recipient clients and the type of devices may be categorized based on their capacity and functionality. The devices categories suitable for the formulated messages may be identified based on the necessary functionality and capability. In this embodiment, those recipient clients whose devices fall into an identified device category may be identified. At decision block 1110, a determination is made as to whether there is any other constraints related to broadcasting the composed message to the identified recipient clients. As described above, the constraint may be a service provider's bandwidth, a set of rules, the recipient client's preferences, the third party request, etc. If it is determined at decision block 1110 that there are no other constraints related to broadcasting the composed messages, at block 1112 the composed message will be broadcast to the devices of the identified recipient clients. If it is determined at decision block 1110 that other constraints have been found, at block 1114 appropriate devices may be selected for each identified recipient via the device selecting subroutine 1000 (FIG. 10).

At block 1116, the formulated broadcast messages may be transmitted to the selected devices. The routine 1100 terminates at block 1118.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for selecting a device suitable for receiving a broadcast message over a digital communication channel, comprising:
   obtaining contextual information that indicates a desirable number of capable VoIP devices for the broadcast message and constraint information relevant to selecting appropriate VoIP devices;
   identifying capable VoIP devices which include functionality and applications necessary to present the broadcast message to a recipient client of;
   wherein if the number of the identified capable VoIP devices is less than the desirable number of capable VoIP devices, downgrading the format of the broadcast message so that the desirable number of capable VoIP devices can be identified;
   selecting appropriate VoIP devices from the capable VoIP devices; and
   transmitting the broadcast message to the appropriate VoIP devices over the digital communication channel.

2. The method of claim 1, wherein selecting the appropriate VoIP device includes determining whether a capable VoIP device is currently available for communication.

3. The method of claim 2, wherein if the capable VoIP device is not currently available, a second capable VoIP device is selected from the capable VoIP devices for receiving the broadcast message.

4. The method of claim 1 further comprising: transmitting the broadcast message to a default device that is specified by the recipient client.

5. The method of claim 1 further comprising:
   obtaining recipient client information relating to selecting the appropriate VoIP devices for the broadcast message; and
   wherein the recipient client information includes profile information of the recipient client.

6. The method of claim 5, wherein the recipient client information includes a set of rules configured by the recipient client.

7. The method of claim 1 further comprising: obtaining additional information relating to broadcasting the broadcast message.

8. The method of claim 7, wherein the additional information includes a network bandwidth.

9. A computer readable medium, excluding a signal, having computer executable components for selecting a device desirable for communicating a broadcast message when executed on a processor, comprising:
   a message component for formulating the broadcast message in a desired format;
   a device selection component for identifying capable devices which include functionality and applications necessary to present the broadcast message to a recipient party and for selecting appropriate devices from the capable devices;
   a communication component for:
   obtaining contextual information that indicates a desirable number of capable devices for the broadcast message and constraint information relevant to selecting the appropriate devices; and
   transmitting the broadcast message to the selected appropriate devices;
   wherein if the number of the identified capable devices is less than the desirable number of capable devices, the message component downgrades the desired format for formulating the broadcast message so that the device selection component can identify the desirable number of capable devices.

10. The computer readable medium of claim 9, wherein the device selection component assigns a preference score to each capable device based on the constraint information relevant to selecting the appropriate devices, and selects the appropriate device with the highest preference score.

11. The computer readable medium of claim 9, wherein the communication component transmits the broadcast message to the appropriate devices in the order of preference scores of the capable devices.

12. The computer readable medium of claim 9, wherein the obtained contextual information further specifies a set of rules defined for broadcasting the broadcast message.

13. The computer readable medium of claim 9, wherein the message component reformulates the broadcast message in the downgraded desired format.

14. A system for selecting a device suitable for receiving a broadcast message over a digital communication channel, comprising:
   a computing device including a network interface, the computing device configured to perform operations, comprising:
   obtaining contextual information that indicates a desirable number of capable VoIP devices for the broadcast message and constraint information relevant to selecting appropriate VoIP devices;
   identifying capable VoIP devices which include functionality and applications necessary to present the broadcast message to a recipient client; wherein if the number of the identified capable VoIP devices is less than the desirable number of capable VoIP devices, downgrading the format of the broadcast message so that the desirable number of capable VoIP devices can be identified;
   selecting appropriate VoIP devices from the capable VoIP devices; and
   transmitting the broadcast message to the appropriate VoIP devices over the digital communication channel.

15. The system of claim 14, wherein selecting the appropriate VoIP device includes determining whether a capable VoIP device is currently available for communication.

16. The system of claim 15, wherein if the capable VoIP device is not currently available, a second capable VoIP device is selected from the capable VoIP devices for receiving the broadcast message.

17. The system of claim 14 further comprising: transmitting the broadcast message to a default device that is specified by the recipient client.

18. The system of claim 14 further comprising: obtaining recipient client information relating to selecting the appropriate VoIP devices for the broadcast message; and wherein the recipient client information includes profile information of the recipient client.

19. The system of claim 18, wherein the recipient client information includes a set of rules configured by the recipient client.

20. The system of system 14 further comprising: obtaining additional information relating to broadcasting the broadcast message.

* * * * *